S. C. WOLFE.
ANCHORING AND TENSION DEVICE FOR TIRE PROTECTORS.
APPLICATION FILED NOV. 14, 1907.

898,714.

Patented Sept. 15, 1908.

2 SHEETS—SHEET 1.

Witnesses

S. C. Wolfe, Inventor

By Seeler & Robb, Attorneys

S. C. WOLFE.
ANCHORING AND TENSION DEVICE FOR TIRE PROTECTORS.
APPLICATION FILED NOV. 14, 1907.
898,714.
Patented Sept. 15, 1908.
2 SHEETS—SHEET 2.
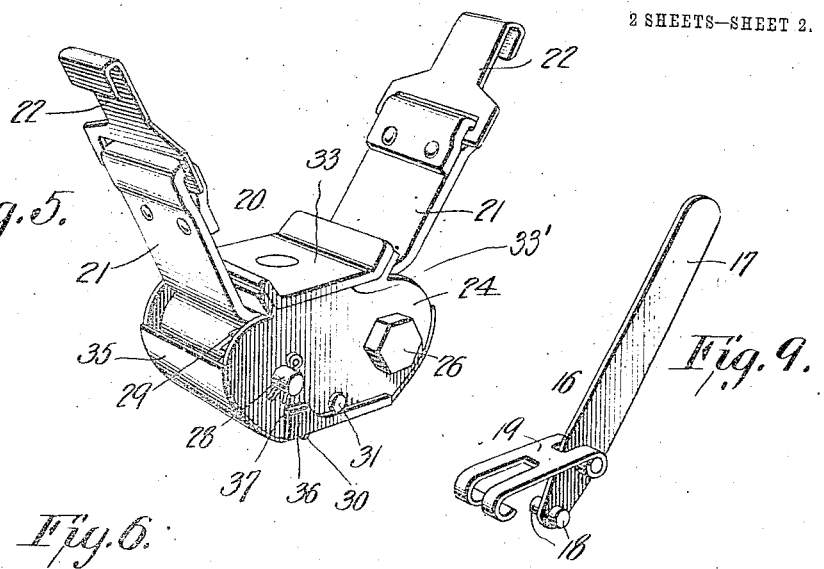
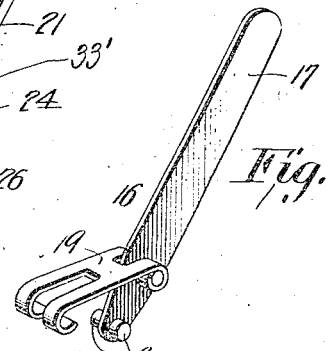
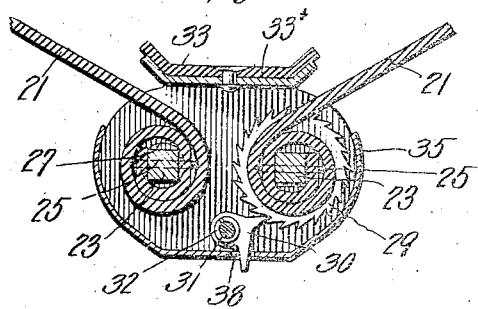
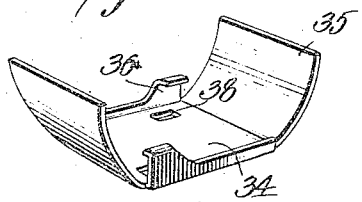
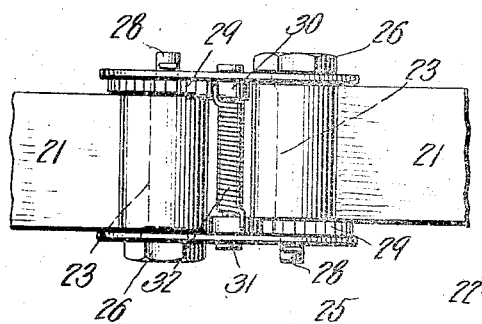
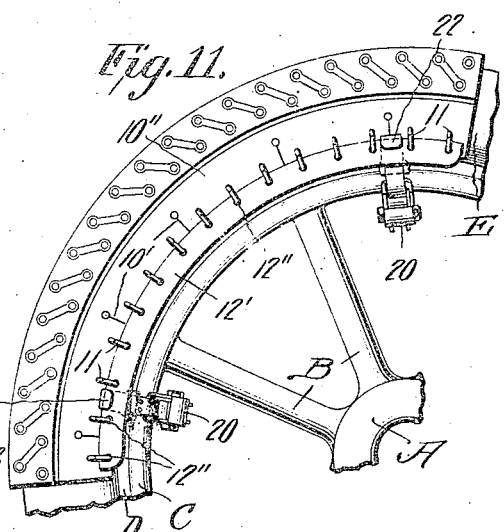

UNITED STATES PATENT OFFICE.

SAMUEL C. WOLFE, OF ANGOLA, INDIANA.

ANCHORING AND TENSION DEVICE FOR TIRE-PROTECTORS.

No. 898,714.

Specification of Letters Patent.    Patented Sept. 15, 1908.

Application filed November 14, 1907. Serial No. 402,121.

*To all whom it may concern:*

Be it known that I, SAMUEL C. WOLFE, a citizen of the United States, residing at Angola, in the county of Steuben and State of Indiana, have invented certain new and useful Improvements in Anchoring and Tension Devices for Tire-Protectors, of which the following is a specification.

This invention relates to devices employed for the purpose of providing armor protectors for the tires of automobile wheels, or the like, of the character referred to in the patent issued to me on the 21st day of May, 1907, No. 854,137. In the present instance, as in the former, I aim to provide a means to substantially and effectually protect the usual resilient tires used on motor cars, motor cycles and other vehicles, either as a covering for the entire tire of the wheel or to cover only a section thereof in the event of a puncture, rupture, or in any other event necessitating a prompt repair by the driver of the vehicle.

Among the objects aimed at in the present invention are to simplify and otherwise improve the means whereby detachable armor coverings for tires may be expeditiously applied to wheels.

Figure 1:
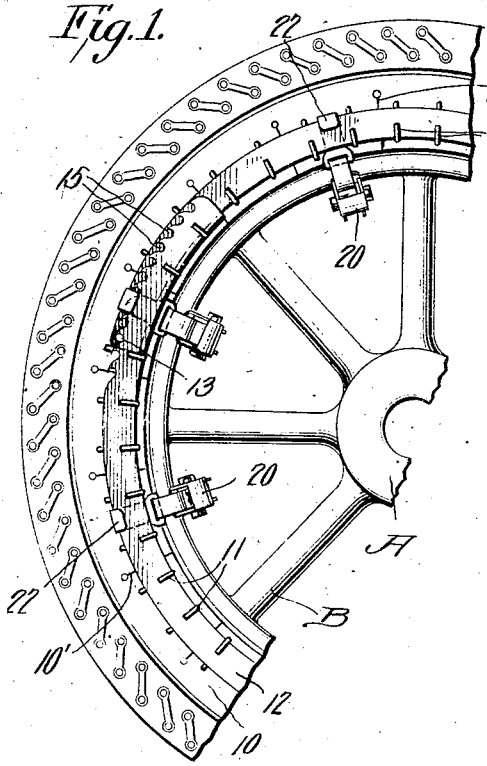
Figure 2:
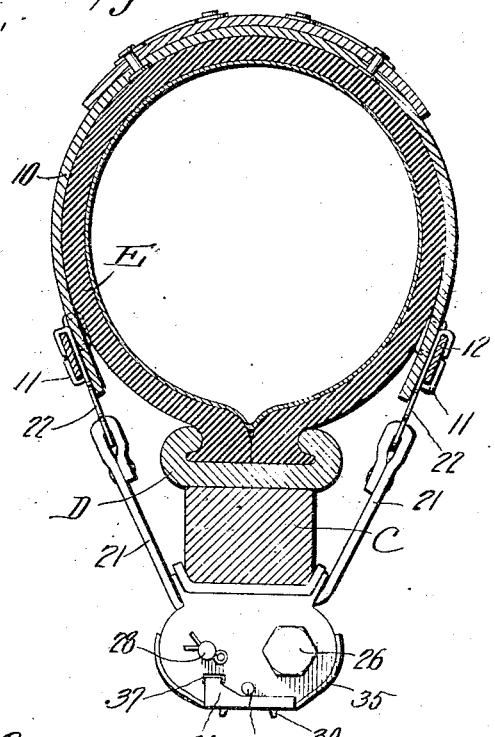
Figure 3:
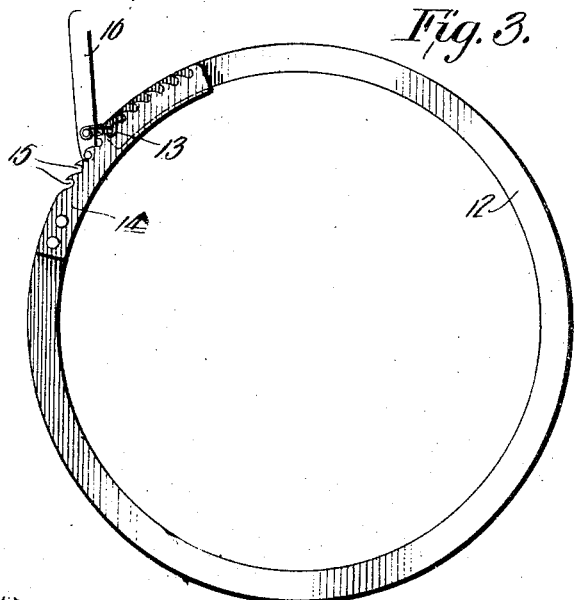
Figure 4:
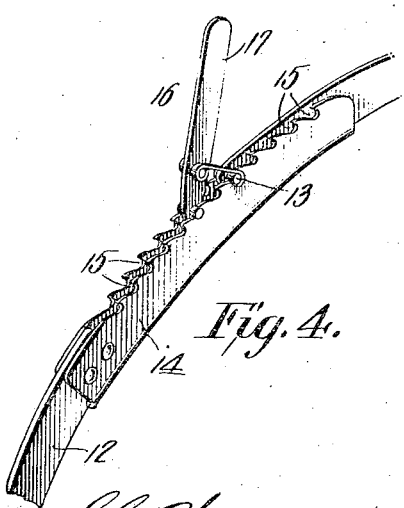

For a full understanding of the invention, including its advantages and mode of operation, reference is to be had to the accompanying drawings and the following detail description in which Figure 1 is a side elevation of a wheel partly broken away, showing the tire protector secured thereto by my improved attaching means; Fig. 2 is a cross section of the same on an enlarged scale, showing one of the anchors in elevation; Fig. 3 is a detached elevation of one of the annular tension plates showing the mode of application of a tool employed in connection therewith; Fig. 4 is a fragmentary perspective view of the same; Fig. 5 is a perspective view of one of the anchors; Fig. 6 is a vertical transverse sectional view of the same; Fig. 7 is a bottom plan view of the anchor with the cover removed to show the internal construction; Fig. 8 is a detail perspective of one of the windlasses with its ratchet wheel; Fig. 9 is a detail view of the tension implement; Fig. 10 is a like view of the sheet metal cover for the anchor, and Fig. 11 is a slightly modified form of the invention, shown as applied to the protector less in extent with the entire periphery of the wheel.

Similar parts are referred to in the following description and indicated on the several views of the drawings by the same reference characters.

The wheel A is or may be of any suitable or approved construction, including spokes B, a felly C, rim D, and a resilient tire E.

The armor protector 10 may be of any preferred construction suitable for the purpose, that herein illustrated being substantially identical with that shown and claimed in my aforesaid patent. The protector sleeve 10 is provided on each side near its margin with a series of suitable attaching devices herein shown as hooks 11, and with which hooks there coöperate attachment plates 12. As indicated these plates 12 are of peculiar construction by reason of the peculiar adaptation thereof for my present purpose. One of said plates is applied to each side of the protector sleeve, and coöperates with all of the hooks 11 on its side of the sleeve.

Speaking now with reference to the use of a complete circular armor, the same being provided with lateral slits 10', the sleeve is first slipped upon the tire loosely, the sleeves being made or provided in such sizes as will fit standard sizes of wheels, the lateral margins of the sleeve will then be drawn inwardly toward the hub of the wheel and the attaching plates 12 will then be assembled with relation to the aforesaid hooks 11. The ring 12 is split, and is provided at one end of the split with a short transverse lug 13 located near the outer margin thereof. At the other end is rigidly secured an arc-shaped ratchet 14, the ratchet teeth 15 thereof being adapted to receive the aforesaid lug 13 when the device is operatively assembled. After the tire protector has been applied as above noted the ring 21 is slipped into place within the hooks 11, it being understood that one of the plates 12 is employed on each side of the protector. This operation is readily performed by hand, and thereafter the implement 16, see Figs. 3, 4, and 9, having a handle 17, the end lug 18, and a pivoted claw 19, is then employed to apply tension to the annular plate 12 whereby the protector will be caused to conform snugly to the tire to which it is applied. In the manipulation of the implement 16, the lug 18 is made to coöperate with the ratchet teeth 15 of the plate, and the claw 19 embraces the lug 13 of the plate and by vibrating the handle 17 in an obvious manner the ends of the split portion of plate 12 are made to forcibly approach each other and accomplish the aforesaid result.

Thus far described the plates 12 constitute only a part of the means employed to finally secure the armor sleeve in place. To positively prevent creeping of the sleeve in the direction of the tire, or any possibility of the same becoming displaced laterally, I provide anchoring means therefor. In the present invention each of the said anchoring devices 20, and a specific description of one will be understood as being applicable to all, comprehends draft means of peculiar construction. While the exact form of such anchor or draft means may be varied to considerable extent within the scope of the spirit of the invention, the form herein illustrated includes a pair of flexible bands 21 of any suitable character, such as leather, thin sheet metal, or the like, each of the bands 21 having at its outer end and secured thereto a flat metal hook or clip 22 adapted to engage with the attaching plate on its side of the sleeve.

As indicated in Figs. 6 and 8, the inner ends of the bands 21 are secured to windlasses 23 journaled in a boxing 24. As an illustration of the various suitable means to secure the inner end of the band 21 to its windlass shaft 23, I show a staple 25 which passes through the end of the band and through the said shaft 23 after which the ends of the staple 25 are bent down firmly in place. Each windlass shaft 23 is provided at one end with a head 26, indicated as being polygonal in form, whereby an ordinary wrench may be applied to turn the same. Adjacent to the inner face of said head is the journal 27 which coöperates with one side of the boxing 24, and at the other end of the shaft 23 is the journal 28 which coöperates with the other side of said boxing. After the anchor has been secured in place with sufficient force to secure the sleeve from displacement, the tension of the same will be maintained by the use of any suitable locking means therefor, herein indicated as the ratchet wheel 29 mounted on the shaft 23 and prevented from normal reverse movement by a dog 30. As shown in Fig. 7 each windlass shaft 23 is furnished with a ratchet 29, and the dogs 30 are mounted upon a common shaft 31 about which is coiled a spring 32, the two ends of which coöperate with the respective dogs 30 holding them normally in coöperation with the wheels.

In order to prevent marring or injury of the inner face of the felly and to increase the grip of the anchor thereon, the boxing 24 is formed with a felly seat 33' at its inner side and in the latter is a facing 33, consisting of such substance as rawhide, textile fabric, or the like, and secured permanently thereto. On the side of the boxing opposite to that just described, I provide a sheet metal cover or sheath, indicated detached in Fig. 10, the same consisting of a main body portion 34, curved end pieces 35 which substantially inclose the shafts 23 and the bands coiled thereon, and lateral flanges having fingers 36 which snap into notches 37 in the sides of the body 24, securing said cover plate in position. The said cover plate is also provided with slots 38 through which the dogs 30 project, so that the latter may be operated to release the ratchets without necessitating the removal of the cover. It will be understood, however, that said cover may be removed if desired by applying a tool to the fingers 36, withdrawing them from the notches 37.

Referring to the form of the invention indicated in Fig. 11, the plates 12' and the sleeve 10" correspond with the plates 12 and the sleeve 10 previously described, but are less in length than the entire periphery of the wheel. In this form of the invention I deem it preferable to provide a short plate 12' with holes 12" to receive the hooks 11, the liability of relative endwise displacement of the parts thereby being prevented. As above described the anchoring means will coöperate with the plates, the clips 22 thereof in both forms being slipped between the plates and the margins of the sleeve and embracing the outer edges of the plates, each clip 22 at such time lying between two adjacent hooks 11.

Having thus described my invention, what I claim as new and desire to secure by Letters Patent of the United States is,—

1. In a tire protector of the class described, the combination of a tire receiving sleeve having free edge portions, means for securing said sleeve to a wheel and comprising rigid split rings detachably applied to the free edge portions of the sleeve, means for adjusting the connection between the ends of the split rings, and tension devices connected with the split rings, each consisting of a housing, windlass shafts mounted in said housing, flexible members connected with the windlass shafts and with the split rings, and means whereby the flexible members may be wound on the shafts for the purpose specified.

2. In a tire protector of the class described, the combination of a tire receiving sleeve, curved plates detachably connected with the opposite free edge portions of the sleeve, and means for securing the sleeve to a wheel and consisting of a housing formed with a felly seat at one side thereof adapted to engage the felly of a wheel and position the housing with respect thereto, separate tension members extending from the opposite ends of the housing and detachably connected with the curved plates applied to the sleeve, and members mounted in the housing for independently adjusting the tension of said tension members to firmly connect the sleeve with a wheel.

3. In a tire protector of the class described, the combination of a tire receiving sleeve provided at its free edge portions with a plurality of hooks, curved plates arranged at the edge portions of the sleeve and engaged by the hooks aforesaid, means for securing the sleeve to a wheel including housings, each housing being formed with a felly seat to receive and engage the felly of a wheel, the opposite ends of the housing being open, shafts journaled in the housing, each shaft being provided with a turning head, and the turning heads aforesaid being arranged on opposite sides of the housing, flexible tension members extending from opposite ends of the housing connected with and adapted to wind about the shafts and adjustable independently of one another, and clips secured to the outer ends of the tension members and detachably engaging the curved plates aforesaid.

4. In a tire protector of the class described, the combination of a tire receiving sleeve, detachable reinforcing plates applied to the edge portions of the sleeve and means for securing the sleeve to a vehicle wheel comprising a plurality of housings and tension devices connected with the plates aforesaid, each housing being formed with a felly seat and having its ends open, the tension device for each housing embodying flexible tension members passing through the opening in the opposite ends of said housing, shafts mounted in each housing and formed with turning heads, the turning heads of the shafts being located on opposite sides of the housing and said shafts being connected with the flexible tension members for independent operation thereof, each housing being provided with a covering plate at its outer portion, said plate having lateral flanges overlapping the sides of the housing and formed with projections interlocking therewith, and ratchet pawls coöperating with the shafts in the housing to hold the tension members at a predetermined adjustment, the covering plate of each housing having openings through which handles of the ratchet members pass.

5. An anchor for detachable tire protectors comprising a housing having a gripping face, power shafts journaled for rotation in said housing, flexible sleeve engaging members secured at their inner ends to said shafts and provided at their outer ends with flat metal clips, and pawl and ratchet devices to normally prevent backward rotation of said power shafts.

In testimony whereof I affix my signature in presence of two witnesses.

SAMUEL C. WOLFE.

Witnesses:
THOMAS B. FREEMAN,
EDW. WILLIAMSON.